United States Patent [19]

Ackerman et al.

[11] 4,065,965
[45] Jan. 3, 1978

[54] ELECTROMAGNETIC FLOWMETER HAVING REMOVABLE ELECTRODE LEADS

[75] Inventors: Thomas Liddon Ackerman, Farmington; Mathew Martin Barbato; Eugene Vidmantas, both of Greece, all of N.Y.

[73] Assignee: Sybron Corporation, Rochester, N.Y.

[21] Appl. No.: 699,670

[22] Filed: July 1, 1976

[51] Int. Cl.² .............................................. G01F 1/58
[52] U.S. Cl. ............................................ 73/194 EM
[58] Field of Search .................................. 73/194 EM

[56] References Cited

U.S. PATENT DOCUMENTS

| | | | |
|---|---|---|---|
| 2,867,119 | 1/1959 | Sturgeon et al. | 73/194 EM |
| 3,397,575 | 8/1968 | Ham | 73/194 EM |
| 3,813,938 | 6/1974 | Grosch et al. | 73/194 EM |
| 3,981,190 | 9/1976 | Vidmantas | 73/194 EM |

Primary Examiner—Charles A. Ruehl
Attorney, Agent, or Firm—Theodore B. Roessel; Joseph C. MacKenzie

[57] ABSTRACT

An electromagnetic flowmeter having a flow tube wherein the electrodes leads pass through potting material forming part of the lining of the flow tube. The leads emerge at the exterior of the flow tube at three points, two of which substantially are at the electrodes, and one of which is between the two electrodes, via conduits embedded in the potting material and exiting from the flow tube at said points. The leads are accessible for repair or replacement.

17 Claims, 5 Drawing Figures

ELECTROMAGNETIC FLOWMETER HAVING REMOVABLE ELECTRODE LEADS

FIELD OF INVENTION

The present invention is in the field of electromagnetic flowmeters having encapsulated internal structures, such as coils, coil boxes, etc.

THE PRIOR ART

In the prior art, the electrode leads of electromagnetic meters having internally mounted field coils, and often the coils or housings therefore, are embedded in potting material. It is therefore more or less impossible to service or replace the leads without disturbing the meter's lining and/or the potting material.

SUMMARY OF THE INVENTION

In the present invention, we provide conduits in the potting material, which conduits isolate the electrode leads from said potting material. Each electrode's one end and each said conduit's both ends exit at the exterior of the flow tube, so the leads can be fed into or out of said conduits when replacing, repairing, inspecting, or installing electrode leads.

The present invention has particular application to the invention of the prior application for U.S. patent Ser. No. 580,281, of Eugene Vidmantas, filed May 23, 1975, entitled ELECTROMAGNETIC FLOWMETER HAVING INTERNAL FIELD COILS, assigned to the assignee of the present invention, and now U.S. Pat. No. 3,981,190.

As explained in the Vidmantas application, the saddle-shaped field coils of an electromagnetic flow meter are housed inside the meter's flow tube, in sturdy saddle-shaped, non-magnetic boxes. Said boxes are secured to the inner wall of a magnetic steel pipe section forming part of said flow tube. With this sort of arrangement, the leads to the electrodes also can be located externally of the flow tube, and also connect to conventional replaceable electrodes having external ends to which connection is to be made.

In the present invention, however, the leads to the electrodes are still externally accessible, but actually run from the electrodes either outside or inside the flow tube to, and out through, a feed-through conveniently located, thereby providing mechanical protection for the leads.

DESCRIPTION OF THE PREFERRED EMBODIMENTS

Figure 5:
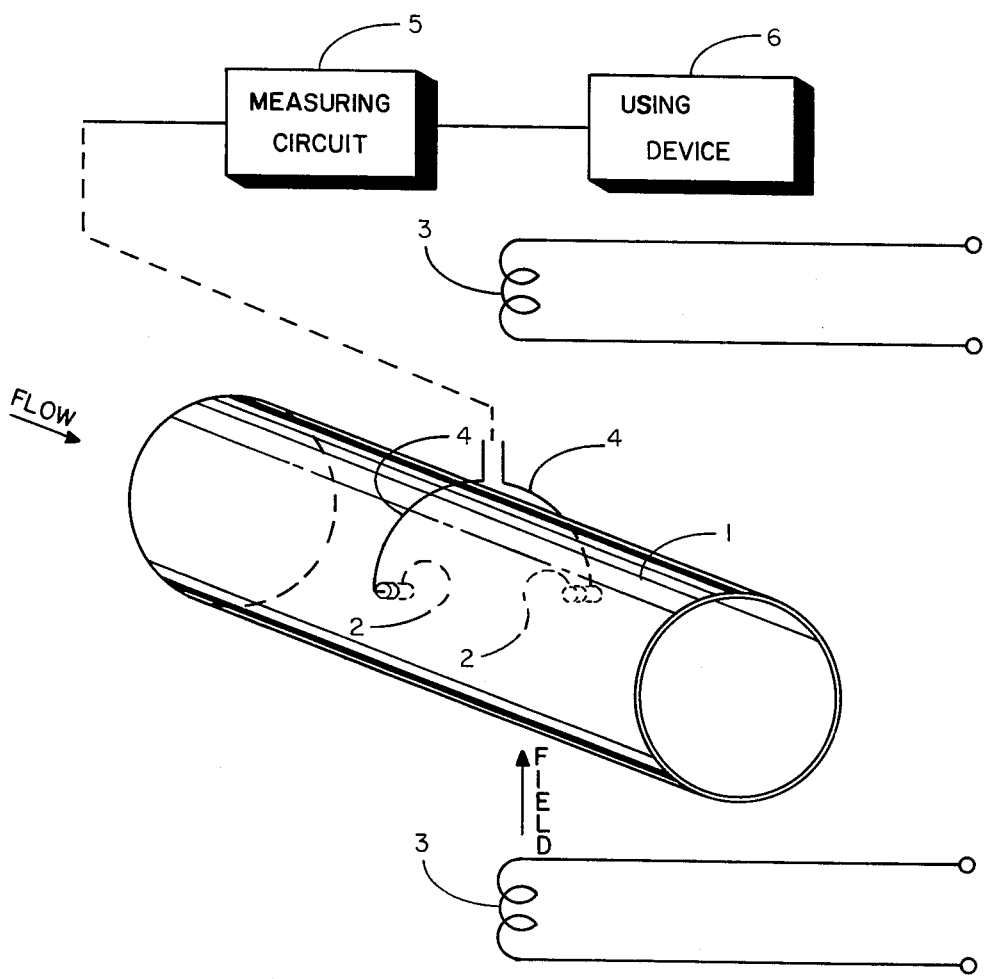
FIG. 5 is a diagram of the principles of an electromagnetic flowmeter.

FIG. 5 shows a flow tube 1 through which an at least slightly electrically-conductive fluid flows, generally a liquid, sometimes a slurry. Electrodes 2 are mounted in the tube wall diametrically opposite one another and in electrical contact with the fluid flowing through the tube. Field coils 3, which are to be electrically energized, are located on opposite sides of the tube so as to generate a magnetic field the direction of which is indicated by the arrow labeled FIELD. The electrodes 2 are electrically connected by leads 4 to measuring circuitry 5 which conditions the voltages sensed at electrodes 2, such as to produce a flow-representative signal for a using device 6 which records, controls or performs some other useful function in a measure determined by the rate of flow through tube 1.

Figure 2:
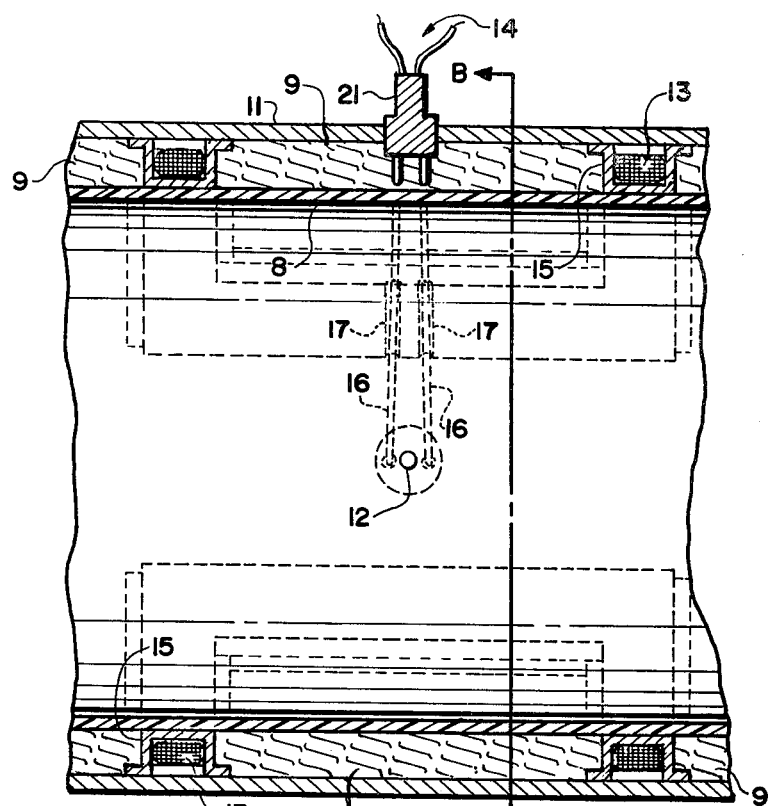
FIG. 2 is the corresponding longitudinal section elevation taken on the plane A of FIG. 1.
Figure 1:
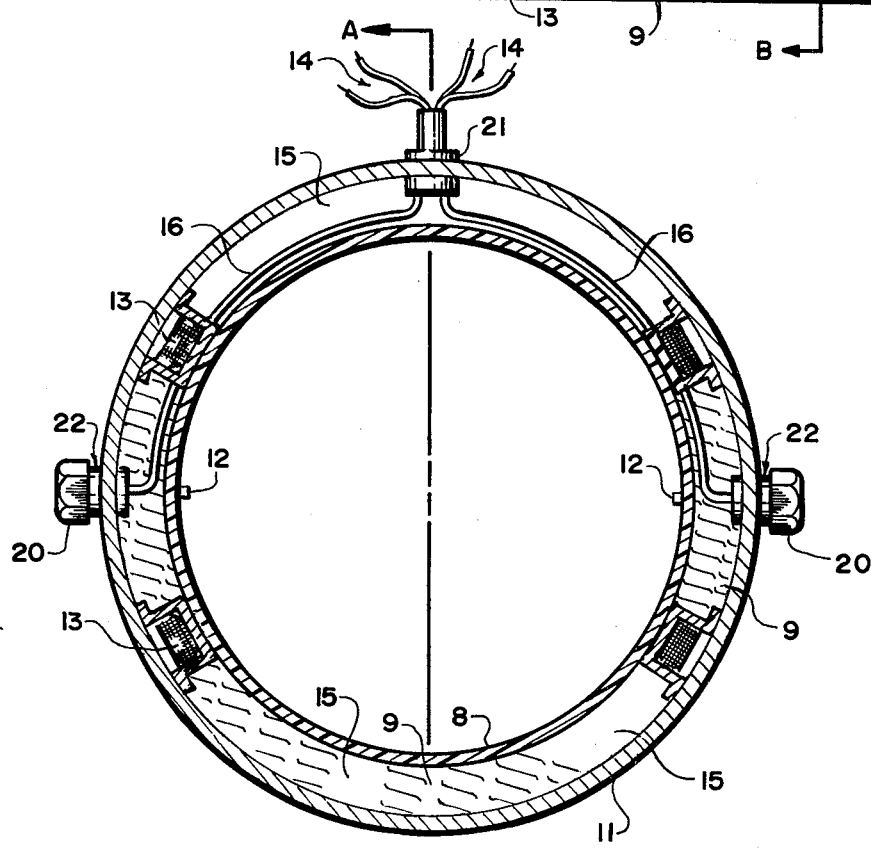
FIG. 1 is a diametrical sectional elevation of an electromagnetic flowmeter according to the invention, taken on the plane B of FIG. 2.

In FIGS. 1 and 2, flow tube 1 is shown to comprise a pipe section 11, liner 8, and body 9. The pipe section 11 and liner 8 are respectively steel and rubber, say, and the body 9 is potting material or encapsulant (partially omitted in FIG. 1, to avoid obscuring structure later to be described), which fills in the space between liner 8 and section 11. The liner 8 and body 9 together define the bore of the flow tube.

In the space containing body 9 are also located saddle-shaped boxes 15 containing field coils 13, access to which coils is preferably provided via holes (not shown) in pipe section 11. We do not show the termination of the flow tube, but as usual suitable means such as flanges, and so on, will normally be provided for attaching the flow tube in a fluid flow line, for metering or controlling the flow therethrough. Likewise, we show no coil connections or source of coil energization as these are not germane to the present invention, although coil terminations or leads could be provided for in the manner in which we are about to describe as applied to the electrode leads 14 of the electrode 12.

Each lead 14 passes through a conduit 16, one end of which attaches to an electrode housing 22 having a cap 20 (which conceals the attachment in FIG. 3) and the other end of which attaches to a feedthrough 21 at the top of pipe section 11, each set of conduits 16 having its own electrode housing, but sharing a single feedthrough fitting. As will be seen from the smoothly curved shape of conduits 16, the leads 14, are necessarily flexible electrically-conductive wire of diameter somewhat narrower than the inner diameter of conduits 16, in order to provide for threading them through the conduits easily and without becoming damaged. Any suitable conduit forms or material: copper, non-magnetic stainless steel, plastic, or the like, can be used to prevent the potting material, which surrounds the conduits, from getting into the conduits and impeding or preventing removal or insertion of the leads, from or in the conduits. Obviously, the inner walls of the conduits must be smoothly curved on the whole and have a surface free of sharp or abrasive elements which could damage the wire or insulation (if any) thereon.

Again, in order to allow conduits 16 to pass by the upper coil box 15, without passing through it, the box may be provided with indentations 17, which form channels, externally of the box, through which channels the conduits 16 can pass.

Figure 3:
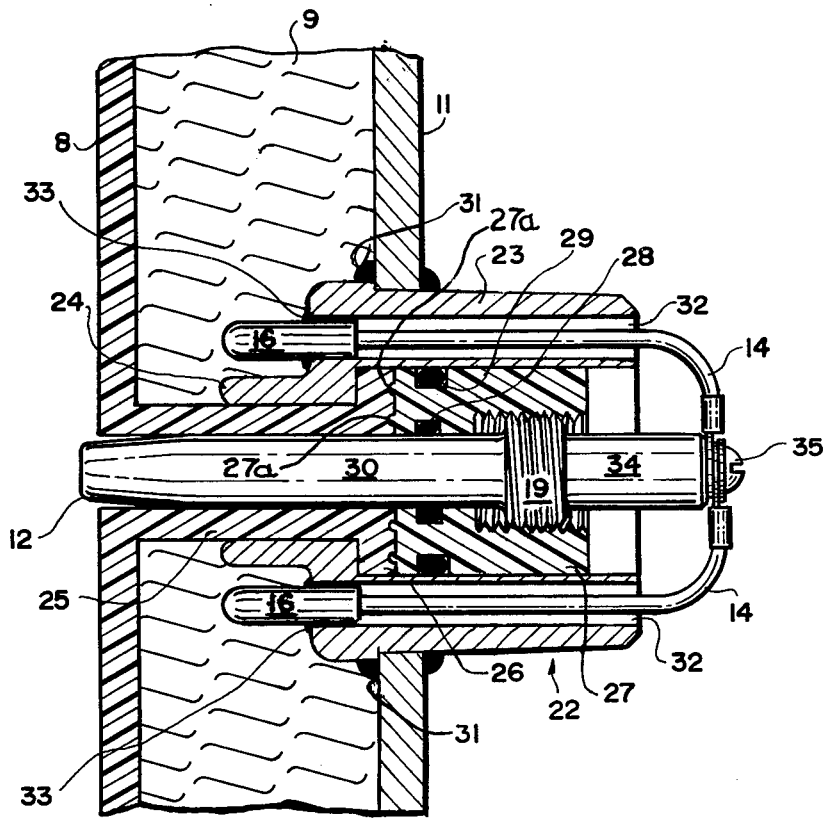
FIG. 3 and 4 are enlarged partly sectional fragments of FIG. 1.

As will be seen from FIG. 3, housing 22 has a right-cylindrical cup portion 23, external to section 11, and a nipple 24 between the latter and the flexible lining 8. Lining 8 has on integral nipple 25 and flange 26, the nipple being received within nipple 24, with flange 26 seating on the bottom of cup portion 23. Seated on the flange is circular collar 27 having inner and outer flexible-material O-rings 28 and 29, the former for sealingly receiving the right cylindrical stem 30 of electrode 12, and the latter for sealing the collar 27 in the cup portion 23. Collar 27 also has annular ridges 27a for sealing between it and flange 26. Electrode 12 has an enlargement 19 secured (as by threads) in the bore of the collar. Housing 22 is welded, as indicated at 31, to section 11.

Suitable follower means (not shown) are provided for forcing the collar 27 to the left in FIG. 3 whereby to sealingly clamp flange 26 between the housing 22 and the collar 27. The electrode is electrically conductive, so collar 27 will be made of insulating material, for example, polyvinyl chloride plastic, in order to electrically isolate the electrode from the housing 22, which would usually be of metal, and from pipe section 11, which would usually be made of steel.

As FIG. 3 shows, the conduits 16 exit through bores 32 in housing 22, and are sealingly fixed to the inner ends thereof, as by welds 32 or a combination of welds and epoxy sealers. The wires 14 may be fixed to the center outer end 34 of electrode 12 by any conventional electrical connecting means, such as the screw terminal 35, etc., as shown in FIG. 3.

Figure 4:
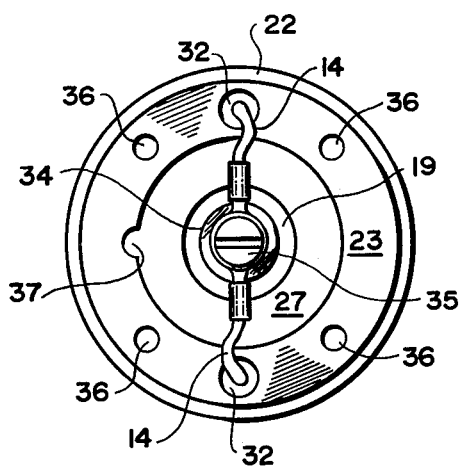

FIG. 4 is largely self-explanatory (it and FIG. 3 are essentially manufacturing drawings, to life-size scale, for example). However, in addition, FIG. 4 shows tapped holes 36 for fixing the above-mentioned follower means (not shown) in the housing 22 (preferably keyed in with the help of notch 37 in the inner wall of cup portion 23). In practice, the caps 20 (not shown in FIGS. 3, 4 and 5) will provide for protectively sealing the interior of housing 23 off from the external atmosphere.

In use, it is obvious that either the leads 14 (singly or collectively) or the electrodes 12 (one or both) may be inserted, removed, replaced, etc., without regard for the rest of the meter (other than to prevent escape of fluid from the meter, if it is an electrode which has to be removed).

The apparent redundancy of electrode leads 14 provides nulling loops. When the meter is initially assembled, the conduits are symmetrically placed with respect to the diametral plane of the electrodes. For nulling, appropriate electrical means (not shown) are coupled to the loops. Thus, FIG. 2, shows one such loop, except that normally the two leads 14, from where they emerge from the feedthrough 21 to where they terminate at one terminal of circuit 5, are arranged as a twisted pair (not shown) for cancelling induced voltages arising between the feedthrough 21 and circuitry 5. There is also a second such loop and twisted pair provided for the other electrode 12, of course.

The foregoing is a description of our invention which will suffice to enable those skilled in the art to make and use our invention. In addition, various modifications may be made in our teachings, which modifications will fall within the scope of our claims. Thus, we have shown our invention in a form providing for nulling loops. However, such loops are not always provided, or necessary, and our invention is equally useful where there would be but a single wire 14 per electrode.

Likewise, our invention would be useful where more than, or fewer than, two fluid-contacting electrodes are provided, or where the electrodes are not actually in contact with the fluid but otherwise within the meter structure and electrically coupled (capacitively, for instance) to the fluid.

Again, the particular flow tube we have chosen for illustrating our invention is essentially a integral double-walled structure, between which walls field coils, and electrode leads and conduits, are contained. However, some times even more complex structure is used for flow tubes, in which the electrode leads (and even the field coils) would be found external to the counterpart of present pipe section 11, but nonetheless quite as inaccessible externally due to their incorporation in structure integral with, yet external to, pipe section 11. In such case, providing these leads with conduits 16 would provide accessibility just as in the present instance, and would also be regarded as being inside the flow tube, even though separated from the liner 8, etc., by structure corresponding to pipe-section 11.

Finally, our invention would still be useful if there were no potting material 9 and/or no coil boxes 15, or with different field coil arrangements, magnetic field sources other than coils, and so on.

We claim:

1. An electromagnetic flowmeter having a flow tube, spaced electrodes, and electrode lead means in said flow tube:

said flowmeter also having bore means in said flow tube for having liquid flow therethrough, magnetic field coil means, and measuring circuitry external to said flow tube, said measuring circuitry being connected by said lead means to said electrodes for measuring voltages arising at said electrodes in response to a flow of conductive liquid through said bore means and between said electrodes while said magnetic field coil means creates a magnetic field in said flow, transverse thereto, and between said electrodes;

said flowmeter also having the improvement including conduit means in said flow tube, said conduit means having said electrode lead means removably contained therein; and said conduit means exiting from the flow tube to the exterior thereof for providing access to said electrode lead means from the exterior of said flow tube for removing said electrode lead means from said flow tube;

there being potting material encapsulating said magnetic field coil means and said conduit means, said electrode lead means being kept by said conduit means from being contacted by said potting material, and there being electrode housings in said flow tube, said electrode housings housing and providing external access to said electrodes, and keeping said electrodes from contacting said potting material; said electrode housings also having connections to said conduit means and having said electrode lead means extending through such connections and thereinto.

2. An electromagnetic flowmeter having a flow tube, spaced electrodes, and electrode lead means in said flow tube;

said flowmeter also having bore means in said flow tube for having liquid flow therethrough, magnetic field coil means, and measuring circuitry external to said flow tube, said measuring circuitry being connected by said lead means to said electrodes for measuring voltages arising at said electrodes in response to a flow of conductive liquid through said bore means and between said electrodes while said magnetic field coil means creates a magnetic field in said flow, transverse thereto, and between said electrodes;

said flowmeter also having the improvement including conduit means in said flow tube, said conduit means having said electrode lead means removably contained therein and said conduit means exiting from the flow tube to the exterior thereof for providing access to said electrode lead means from the exterior of said flow tube for removing said electrode lead means from said flow tube;
said conduit means being between said bore means and said flow tube, and exiting from said flow tube at each said electrode, and at a point on said flow tube between said electrodes.

3. The electromagnetic flowmeter of claim 2 wherein said field coil means is in said flow tube and, along with said conduit means are encapsulated by potting material between said flow tube and said bore means.

4. The electromagnetic flowmeter of claim 3 wherein said field coil means is isolated from direct contact with said potting material by coil boxes.

5. An electromagnetic flowmeter having a flow tube, spaced electrodes, and electrode lead means in said flow tube;
said flowmeter also having bore means in said flow tube for having liquid flow therethrough, magnetic field coil means, and measuring circuitry external to said flow tube, said measuring circuitry being connected by said lead means to said electrodes for measuring voltages arising at said electrodes in response to a flow of conductive liquid through said bore means and between said electrodes while said magnetic field coil means creates a magnetic field in said flow, transverse thereto, and between said electrodes;
said flowmeter also having the improvement including conduit means in said flow tube, said conduit means having said electrode lead means removably contained therein; said conduit means exiting from the flowtube to the exterior thereof for providing access to said electrode lead means from the exterior of said flow tube for removing said electrode lead means from said flow tube;
said conduit means including a first conduit between said bore means and said flow tube, and exiting from said flow tube at one end of said first conduit and at one said electrode, and a second conduit between said bore means and said flow tube, and exiting at one end thereof from said flow tube and at the other said electrode, and the other end of each said conduit exiting from said flow tube at a point between said electrodes.

6. The electromagnetic flowmeter of claim 5, wherein said field coil means is in said flow tube and, along with said conduit means are encapsulated by potting material between said flow tube and said bore means.

7. The electromagnetic flowmeter of claim 6, wherein said field coil means is isolated from direct contact with said potting material by coil boxes.

8. An electromagnetic flowmeter having a flow tube, spaced electrodes, and electrode lead means in said flow tube;
said flowmeter also having bore means in said flow tube for having liquid flow therethrough, magnetic field coil means, and measuring circuitry external to said flow tube, said measuring circuitry being connected by said lead means to said electrodes for measuring voltages arising at said electrodes in response to a flow of conductive liquid through said bore means and between said electrodes while said magnetic field coil means creates a magnetic field in said flow, transverse thereto, and between said electrodes;
said flowmeter also having the improvement including conduit means in said flow tube, said conduit means having said electrode lead means removably contained therein; and said conduit means exiting from the flow tube to the exterior thereof for providing access to said electrode lead means from the exterior of said flow tube for removing said electrode lead means from said flow tube;
each said electrode being part of an electrode assembly sealingly and removably mounting said electrode in the wall of said bore means, with one end of such electrode exposed inside said bore means; said lead means including lead wires and the other end of each said electrode being external to said flow tube and having one of said lead wires connected to it, with such lead wire coming off such connection and going into said conduit means; said conduit means being smoothly curved conduits each connected at one end to a said electrode assembly and having non-damaging interior surfaces, the other ends of said conduits being connected to a feedthrough located at a point on said flow tube between said electrodes.

9. The electromagnetic flowmeter of claim 8, each electrode assembly having an electrode housing communicating with the corresponding said conduit, said housing having a cap, said cap being removable to expose the connection of the electrode lead wire and electrode end, and also the entrance of the corresponding said lead wire into the conduit means.

10. The electromagnetic flowmeter of claim 8, wherein said conduit means comprises a pair of said conduits for each electrode, the two ends of each such pair being connected to the corresponding said electrode assembly, and the other ends of each said pair being connected to said feedthrough.

11. The electromagnetic flowmeter of claim 8, wherein said conduits are between said bore means and said flow tube, and exit from said flow tube at each said electrode and at said feedthrough.

12. An electromagnetic flowmeter having a flow tube, spaced electrodes, and electrode lead means in said flow tube;
said flowmeter also having bore means in said flow tube for having liquid flow therethrough, magnetic field coil means, and measuring circuitry external to said flow tube, said measuring circuitry being connected by said lead means to said electrodes for measuring voltages arising at said electrodes in response to a flow of conductive liquid through said bore means and between said electrodes while said magnetic field coil means create a magnetic field in said flow, transverse thereto, and between said electrodes;
said flowmeter also having the improvement including conduit means associated with said flow tube, said conduit means providing access to said electrode lead means and from the exterior of said flow tube, said conduit means having said electrode lead means removably contained therein, and said conduit means being between said bore means and said flow tube, and exiting from said flow tube at each said electrode, and a point on said flow tube between said electrodes.

13. The electromagnetic flowmeter of claim 12 wherein said field coil means is in said flow tube and, along with said conduit means are encapsulated by potting material between said flow tube and said bore means.

14. The electromagnetic flowmeter of claim 13 wherein said field coil means is isolated from direct contact with said potting material by coil boxes.

15. The electromagnetic flowmeter of claim 12, wherein said conduit means includes a first conduit between said bore means and said flow tube, and exiting from said flow tube at one end of said first conduit and at one said electrode, and a second conduit between said bore means and said flow tube, and exiting at one end thereof from said flow tube and at the other said electrode, and the other end of each said conduit exiting from said flow tube at a point between said electrodes.

16. The electromagnetic flowmeter of claim 15, wherein said field coil means is in said flow tube and, along with said conduit means are encapsulated by potting material between said flow tube and said bore means.

17. The electromagnetic flowmeter of claim 16, wherein said field coil means is isolated from direct contact with said potting material by coil boxes.

* * * * *